Patented Jan. 3, 1956

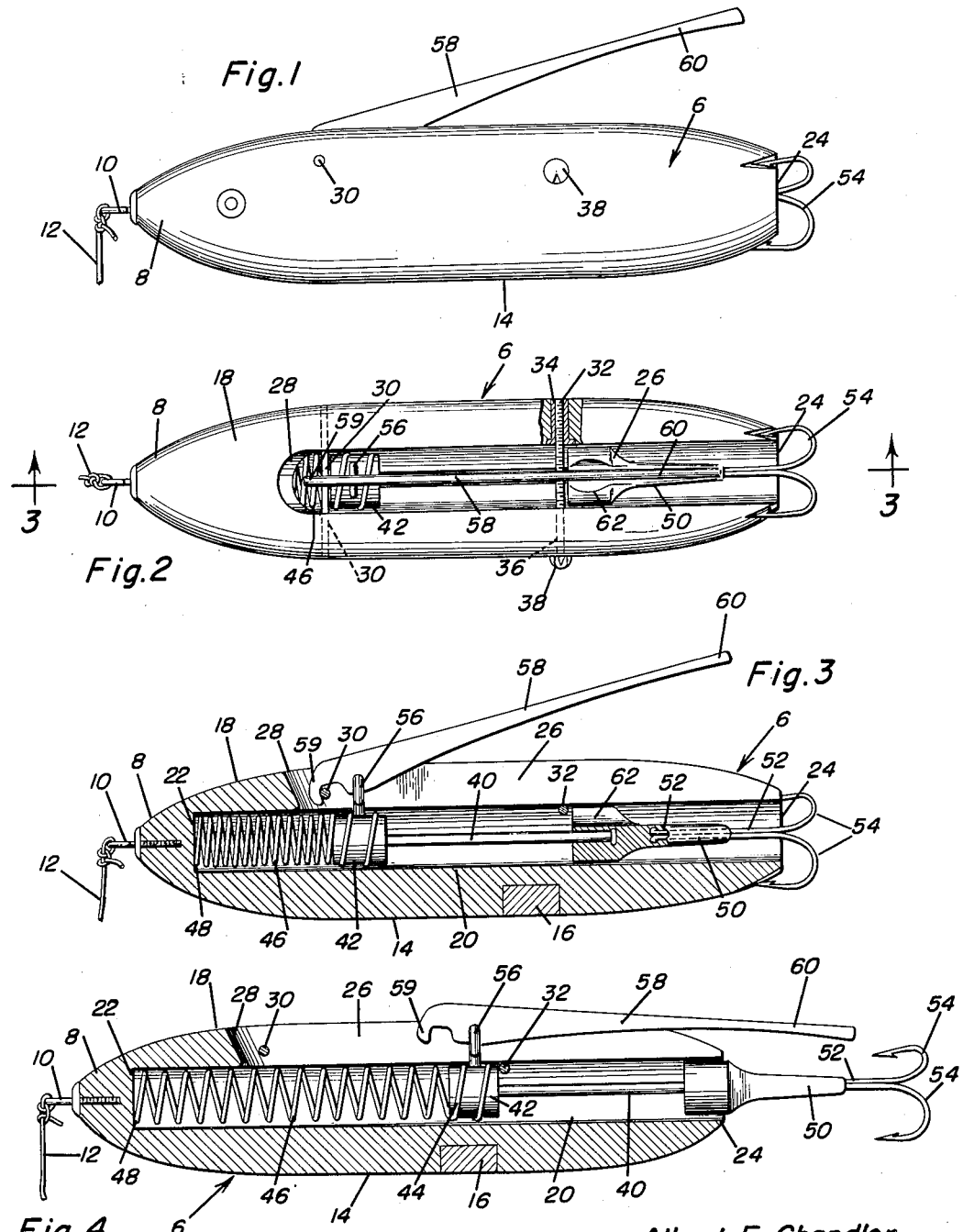

2,729,013

ARTIFICIAL FISHING BAIT

Albert E. Chandler, San Antonio, Tex.

Application January 14, 1954, Serial No. 403,958

2 Claims. (Cl. 43—35)

The present invention relates to an artificial fishing bait which is characterized, broadly speaking, by a buoyant plug which is appropriately designed and shaped to function as a lure, and is provided with a novelly constructed hook-equipped projectable and retractable plunger assembly.

One object of the invention has to do with a structurally and functionally novel so-called plunger assembly, that is, a spring-biased plunger rod with spring means on one end, hook-means on the other end and a permanently attached but pivotally mounted trip-latch, said assembly being distinctive in that it provides a novel unit which is applicable and removable, in relation to any one of a plurality of plugs which are suitably constructed to accommodate and carry said assembly.

Another object of the invention is to provide an artificial fishing bait comprising, in combination, a buoyant plug, a spring-biased plunger, hook, and trip-latch assembly readily attachable to and detachable from said plug, and an insertable and removable assembling and retaining screw carried by said plug, cooperable with said assembly and securing the same in its operative position on the plug, whereby said assembly may be interchangeably used with exchangeable plugs.

Further novelty is predicated on the stated plug which comprises an elongate body which is shaped to resemble a given type of bait, said plug having an axial socket closed at one end and open at the opposite end and a communicating slot which is substantially commensurate in length with the socket and in which the stated assembly is adaptably and operatively fitted making it possible for the owner to carry any number of plugs of different shapes and colors for deep or shallow running, with or without spinners and poppers and permitting the fisherman to change baits at will and carry variegated plugs in his pocket, minus the usual troublesome hooks.

In the drawings:

Figure 1 is a side elevational view of the improved artificial bait showing the same set for use;

Figure 2 is a top plan view of the same with a portion broken away and appearing in section.

Figure 3 is a central longitudinal section on the line 3—3 of Figure 2 and

Figure 4 is a like sectional view showing how the parts appear in relation to each other when the trip-latch has been released and the plunger has been projected to set the fish-hooks in the mouth of the fish.

As before stated, the invention contemplates the use of a multiplicity or group of buoyant plugs with or without spinners and attending equipment (not shown). These plugs may vary in color and shape in an obvious manner. However, certain of the features of each of the plugs are standardized. The single plug here represented is typical and it is denoted by the numeral 6 and it comprises an elongate buoyant body, the leading or forward end of which is denoted at 8 and is provided with an axially fixed eye 10 to which the fishing line 12 is connected. The ventral or belly portion 14 is provided with a socket containing a weight 16 which provides the desired ballast and serves to keep the dorsal or top side 18 normally up. The stated body is axially bored to provide a lengthwise socket 20 which is closed at the leading end as at 22 and open at the trailing end as at 24. In the dorsal side there is an elongate slot 26 which is substantially commensurate in length with the socket, that is, slightly shorter. The forward end 28 of the slot is closed and the opposite end is open. This slot is radial to and communicates with the socket. At the forward end of the stated slot is a fixed keeper-pin 30. Intermediate the ends of the plug and situated in the bore or socket is a readily insertable and removable screw or pin 32 which constitutes the plunger assembly assembling and retaining member. This pin spans the socket transversely and has its screw-threaded end removably screwed into a socket provided therefor as at 34 on one side of the socket. On a diametrically opposite side there is a hole 36 through and beyond which the headed end 38 extends. This assembling and retaining screw is readily insertable and removable, as is evident.

The aforementioned plunger assembly comprises a rigid linearly straight plunger rod 40 having a head 42 fixed on the leading end to accommodate and retain the adjacent coil 44 of the expandable and contractable coil spring 46. This spring is normally located in the socket and the foremost coil 48 merely bears against the closed end 22, as is clear in Figures 3 and 4. Affixed to the opposite or trailing end of the rod is a coupling member 50 with which the shank portion 52 of the fish hooks 54 connects. The head is provided with a lateral or radial eye-screw 56 with which the hook-latch or arm 58 is pivotally connected.

The forward pivoted end of the arm terminates in a keeper-hook which is positioned and arranged to releasably engage the keeper-pin, said keeper-hook denoted by the numeral 59. The rear trailing end portion 60 of the arm is swingable toward and from the coupling member 50. If desired, the top of this coupling member may be provided with a recess 62, as shown in Figures 2 and 3 to permit the cooperating portion of the arm to fold close in and to lie alongside of the plunger rod, in an obvious manner.

In practice, the plunger assembly is slipped into the plug with the spring, rod and hook means in axial alinement with the socket and with the trip arm located for operation in relation to the slot 26. To set the device all that is necessary is to grasp the leading end portion 8 of the plug in the left hand, holding the same with the forefinger and thumb. The plunger is forced in against the tension of the spring and the hooks embrace the trailing end of the plug in the manner shown. With the spring satisfactorily compressed the user simply presses down on the hooked end of the trigger or trip-latch with the left thumb until the catch or keeper-hook 59 is engaged with the keeper-pin 30 in an obvious manner. The plug is then set and ready to cast. The relationship of parts, when the device is set for use, is brought out in Figures 1, 3 inclusive. When the fish strikes and swallows the free end portion 60 of the trip-arm, the latter is squeezed in the mouth of the fish and the arm is pivoted and the keeper means released, whereupon the coil spring projects the plunger to the position shown in Figure 4 to make the catch.

Any number of fish hooks may be provided. The bait may be made in any size. Experience has shown that the fish strikes hard either from the side or back and rarely fails to hook the plunger means.

The head 38 on the assembling screw will be of sufficient size so that it may be readily grasped and inserted and removed, making it possible to shift and transfer the stated plunger assembly from one plug to another, in an obvious manner.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An artificial fishing bait comprising an elongate buoyant plug having an axial socket closed at the leading end and open at the opposite end and opening through the trailing end of the plug, and having an elongated slot communicating with the socket and opening through one lengthwise side of the plug and also through the trailing end of the plug, the leading end of said slot being closed and spaced rearwardly from the leading end of said socket, a keeper pin fixed in said plug and spanning the slot adjacent the closed end of the slot, a readily insertable and removable assembly comprising a linearly straight rigid rod having an enlarged head fixed to one end of the rod, said rod and head being normally confined but slidable in said socket and said head being spaced from the closed end of the socket, a coil spring axially aligned with the rod and affixed at one end to said head and having its opposite end resting removably against the closed end of said socket, a coupling member fixed to the other end of said rod, fishhook means arranged exteriorly of the trailing end of said plug and integrally connected with said coupling member, a trip-latch pivotally mounted on said head and having a portion opposed to said rod and a leading end portion provided with a keeper hook releasably engaged with the aforementioned keeper pin, and a readily insertable and removable assembling and retaining screw for said assembly fixed to the plug and having a portion located in and spanning the socket between the ends of the socket and also occupying a position between the coupling member and said head to, in this manner, removably retain the assembly in said socket, said fishhook means having hook portions engaging and being normally guarded by said plug, and that portion of said rod which is slidable in said socket being urged outwardly thereof by and when the trip latch keeper hook is released, whereby the hook portions of said fishhook means are disengaged from said plug and exposed to make a catch.

2. For use on and in conjunction with a socketed and slotted portion of a buoyant plug, a projectible and retractible plunger assembly which is adapted to be readily inserted into and removed from the socketed and slotted portion of said plug comprising a linearly straight rigid rod having an enlarged head fixed to the leading end of the rod and a coupling member secured to the trailing end of the rod and provided with rigidly attached fishhooks, an eye fixed to and radiating from said head, a coil expansion spring axially aligned with the rod and affixed at one end to said head and a trip-latch arm provided at one end with a keeper hook, said arm adjacent said one end being pivotally joined to said eye rearwardly of said keeper hook whereby said trip latch arm is adapted to pivot toward and away from said rod and coupling member between a keeper hook latching position and a keeper hook releasing position.

References Cited in the file of this patent

UNITED STATES PATENTS

| 395,480 | Brewster | Jan. 1, 1889 |
| 610,098 | Sly | Aug. 30, 1898 |
| 1,017,088 | Dremel | Feb. 13, 1912 |
| 1,462,949 | Walls | July 24, 1923 |
| 2,010,641 | Nyvall | Aug. 6, 1935 |
| 2,518,238 | Keeler | Aug. 8, 1950 |
| 2,572,817 | Reed | Oct. 23, 1951 |

FOREIGN PATENTS

| 257,054 | Switzerland | Mar. 16, 1949 |